United States Patent [19]

Kawasaki

[11] Patent Number: 4,939,892
[45] Date of Patent: Jul. 10, 1990

[54] GAIT TYPE MOWER

[75] Inventor: Masami Kawasaki, Osaka, Japan

[73] Assignee: Kubota Ltd., Osaka, Japan

[21] Appl. No.: 389,547

[22] Filed: Aug. 4, 1989

[30] Foreign Application Priority Data

Sep. 21, 1988 [JP] Japan .................................. 63-237674

[51] Int. Cl.⁵ ....................... A01D 34/70; A01D 35/22
[52] U.S. Cl. ......................................... 56/11.1; 56/11.6
[58] Field of Search ...................... 56/10.1, 10.8, 11.1, 56/11.6, 14.7, 14.8, 16.7

[56] References Cited

U.S. PATENT DOCUMENTS

| | | | |
|---|---|---|---|
| 2,705,393 | 4/1955 | Cofer | 56/11.6 |
| 3,766,722 | 10/1973 | Kamlukin et al. | 56/11.6 |
| 4,787,195 | 11/1988 | Wenzel | 56/11.1 |

Primary Examiner—Thuy M. Bui

[57] ABSTRACT

There is disclosed a gait type mower constructed such that a mowing unit is mounted on a front part of a vehicle, driving wheels are provided at a rear part thereof, and handles are installed backwards. An engine and a variable speed gear interlocking therewith are loaded on the vehicle. The power is imparted from output shafts of the gear via belt transmission mechanisms to the driving wheels. An improved mower is arranged such that: the engine is placed in front of the axle, while the variable speed gear is placed behind the axle; the output shafts are positioned substantially upwardly of the axle in front of the gear; and the belt transmission mechanisms are disposed in the up-and-down directions.

12 Claims, 3 Drawing Sheets

GAIT TYPE MOWER

FIELD OF THE INVENTION AND RELATED ART STATEMENT

The present invention relates to a gait type mower for mowing the lawn.

One typical arrangement of a conventional gait type mower for mowing the lawn is that a front part of a vehicle body is equipped with a mowing unit, a rear part thereof is provided with a pair of right and left driving wheels, and handles are installed on the back side thereof. The vehicle body is loaded with an engine and a variable speed gear. The power is imparted from a pair of right and left output shafts of the variable speed gear via belt transmission mechanisms to the pair of right and left driving wheels.

In this type of mower, the engine and the variable speed gear have heretofore been mounted simply on the vehicle in the vicinity of the driving wheels. Based on this construction, the weight equilibration is not obtained in front and in rear of the driving wheels when lifting the front part of the vehicle. It is therefore difficult to turn the vehicle. More specifically, on the occasion of quick gyration when changing direction, a steering clutch associated with the gyrating direction is switched off to stop the rotation of a driving wheel, and at the same moment the front part of the vehicle is lifted to effect the gyration by a driving force of the other driving wheel. In the prior art, however, a well-balanced condition in weight is not developed in front and in rear of the driving wheels, and hence the rear handles have to be forcibly depressed to raise the front part of the vehicle, resulting in difficulty of gyration.

The output shafts are conventionally equipped at the rear part of variable speed gear. The belt transmission mechanisms are disposed in the to-and-fro directions to extend from the output shafts to the driving wheels. A vehicle height above the ground level is decreased because of the presence of the belt transmission mechanisms. Hence, there exists a possibility in which the belt transmission mechanisms or their covers impinge upon obstacles lying on the ground.

OBJECTS AND SUMMARY OF THE INVENTION

It is a first object of the present invention eliminate the foregoing problems inherent in the prior art and to provide a gait type mower capable of ameliorating the weight equilibration in front and in rear of driving wheels when lifting a front part of a vehicle and also effecting the gyration with facility and with stability simply by slightly depressing rear handles.

It is a second object of the invention to provide a gait type mower arranged such that a sufficient height of a vehicle rear part above the ground level is secured, and there is made no impingement upon obstacles lying on the ground even when raising the vehicle front part to perform the gyration To accomplish these objects, in accordance with the present invention there is provided a gait type mower comprising: a vehicle 1; a mowing unit 3 mounted on a front part of vehicle 1; a pair of right and left driving wheels 4 provided at a rear part thereof; handles 5 positioned on the back side thereof; an engine 16 loaded on vehicle 1; a variable speed gear 18 interlocking with engine 16 and likewise loaded on vehicle 1; a pair of right and left output shafts 20 fitted to variable speed gear 18; and belt transmission mechanisms 37 for imparting the power from the pair of right and left output shafts 20 to the pair of right and left driving wheels 4, characterized in that: engine 16 is placed in front of an axle 13 of driving wheels 4, while variable speed gear 18 is placed in rear of axle 13; output shafts 20 are positioned substantially upwardly of axle 13 in front of variable speed gear 18; and belt transmission mechanisms 37 are disposed in the up-and-down directions.

BRIEF DESCRIPTION OF THE DRAWINGS

Other objects and advantages of the invention will become apparent during the following discussion in conjunction with the accompanying drawings, in which.

The drawings in combination show a preferred embodiment of the present invention.

DETAILED DESCRIPTION OF THE PREFERRED EMBODIMENT

An illustrative preferred embodiment of the present invention will hereinafter be described in detail.

Figure 1:
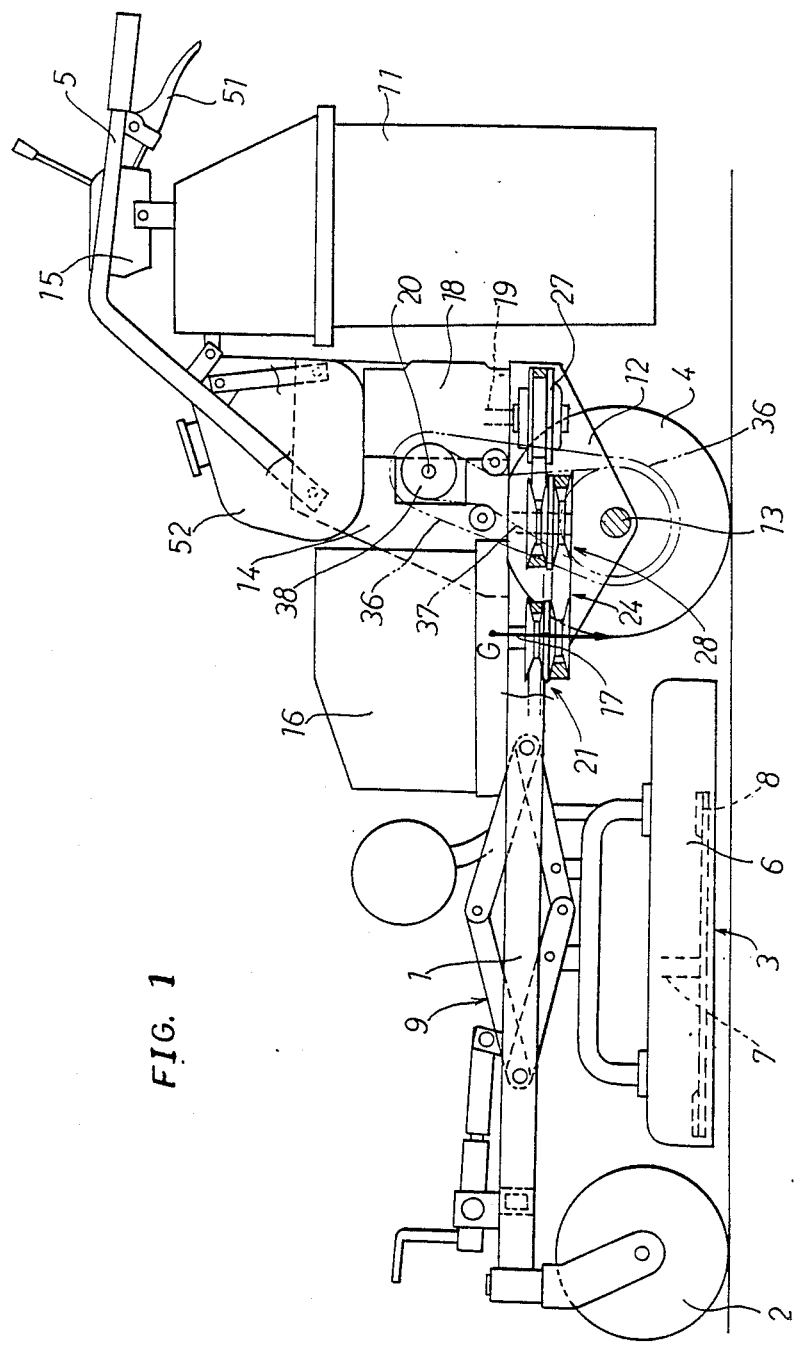
FIG. 1 is a side elevation of a vehicle with a rear part partially broken away.
Figure 2:
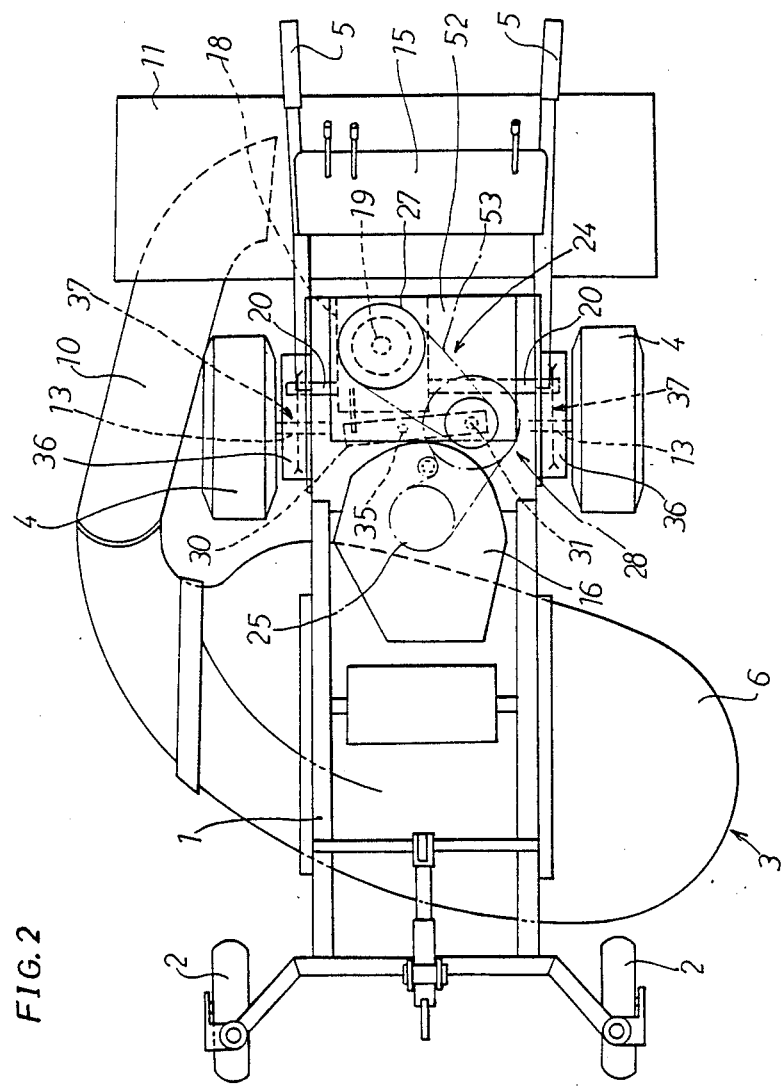
FIG. 2 is a plan view thereof.

Turning first to FIGS. 1 and 2, a vehicle generally designated at 1 includes a pair of right and left caster wheels 2 provided at a front end thereof, a mowing unit 3 mounted on a front part thereof, a pair of right and left driving wheels 4 secured to a rear part thereof, and a pair of right and left handles 5 provided backwards.

Mowing unit 3, classified as a rotary type unit, includes mowing blades 8 which are provided under a deck 6 and rotate about a vertical shaft 7. Mowing unit 3 capable of adjusting a mowing height is mounted on the underside of vehicle 1 through a pair of right and left parallel link mechanisms 9. Connected to one end of deck 6 is a duct 7 through which the grasses mowed by mowing blades 8 are thrown into grass box 11. Grass box 11 is installed downwardly of handles 5.

Driving wheels 4 supported via axle 13 on brackets 12 installed on both sides of the rear part of vehicle 1. Each of driving wheels 4 is arranged to be rotatable independently. Handles 5 are attached to support plates 14 fitted to bilateral rear parts of vehicle 1 and extend from support plates 14 in an upper backward oblique direction. Right and left handles 5 are connected to each other at their mid-portions by means of an operation panel 15.

The numeral 16 represents an engine loaded on a laterally central portion of vehicle 1 in a position closely in front of axle 13. Secured to engine 16 is a crank shaft 17 protruding downwards. A variable speed gear 18 is mounted on vehicle 1 to slightly deviate on one side from the crosswise central portion thereof in a position closely to the rear of axle 13. Therefore, engine 16 and variable speed gear 18, which are disposed close to each other in the to-and-fro directions, are mounted on vehicle 1 in front and in rear of axle. 13. This arrangement presents a well-balanced weight condition in front and in rear of driving wheels when lifting the front part of vehicle 1. The front part of vehicle 1 can readily be raised simply by slightly pushing down handles 5. Variable speed gear 18 has an input shaft 19 projecting downwards and a pair of right and left output shafts 20 bilaterally protruding from the front part thereof, the output shafts being disposed substantially in higher positions than axle 13.

Figure 3:
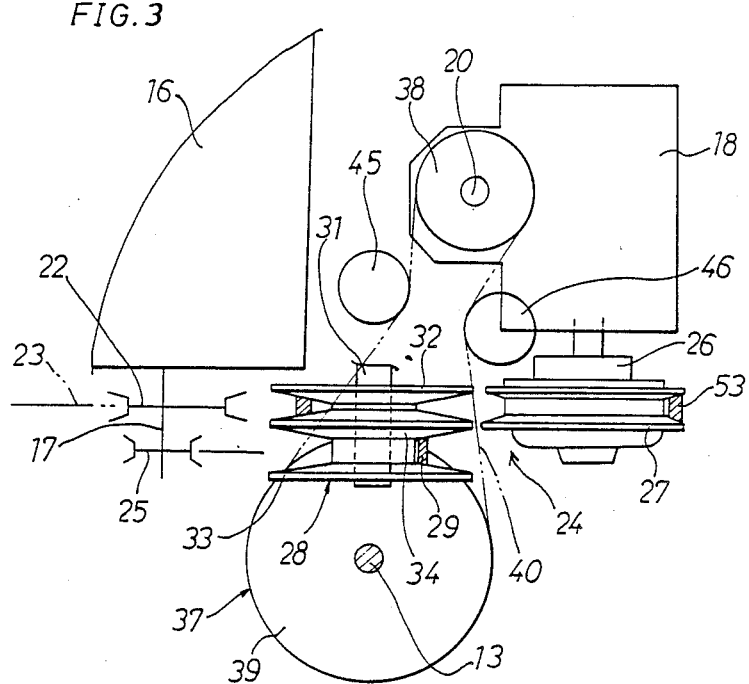
FIG. 3 is a block diagram illustrating a power transmission system.

The numeral 21 denotes a belt transmission mechanism for driving a vertical shaft 7 of mowing unit 3. Belt transmission mechanism 21 is, as depicted in FIG. 3, constructed by winding a belt 23 on a driving pulley 22 fixed to crank shaft 17 of engine 16. The numeral 24 represents an infinite belt type variable-speed drive for interlocking engine 16 with variable speed gear 18. Infinite variable-speed drive 24 is so disposed upwardly of axle 13 as to assume a substantially L-shape in plan in close proximity to the underside of vehicle 1. Infinite variable-speed drive 24 is also covered with a pair of right and left brackets 12 from both sides.

Infinite variable-speed drive 24, as illustrated in FIG. 3, comprises: a driving pulley 25 fixed to crank shaft 17 of engine 16; an input pulley 27 attached via a main clutch 26 to an input shaft 19; a variable speed pulley 28 interposed between pulleys 25 and 27; a belt 29 wound on driving pulley 25 and on variable speed pulley 28; and a belt 53 wound on input pulley 27 and on variable speed pulley 28. Variable pulley 28 is composed of a pair of upper and lower fixed pulley members 32 and 33 fixed to a rotary shaft 31 provided at the top of oscillation arm 30, and a slide pulley member 34 so cover-fitted to rotary shaft 31 as to be slidable only in the up-and-down directions between pulley members 32 and 33. Oscillation arm 30 is pivotally supported through a fulcrum shaft 35 on vehicle 1 so that the oscillation arm is able to oscillate back and forth. Infinite variable-speed drive 24 causes oscillation arm 30 to properly oscillate and is capable of infinitely changing the speed in an arbitrary manner by varying the position of variable speed pulley 28.

Figure 4:
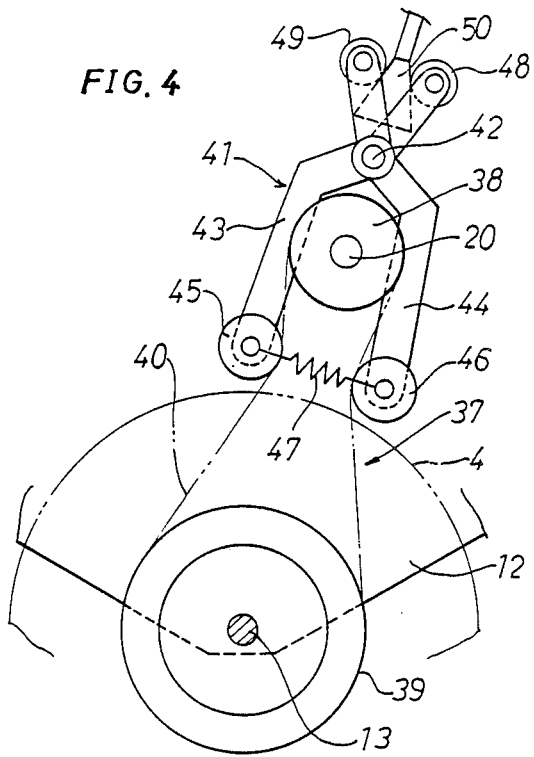
FIG. 4 is a block diagram depicting a steering clutch.

Output shafts 20 of variable speed gear 18 are adapted to transmit the power to the pair of right and left driving wheels 4 via belt transmission mechanisms 37 encased in transmission cases 36 vertically disposed on both sides of vehicle 1. Belt transmission mechanisms 37, as depicted in FIG. 4, consist of output pulleys 38 fixed to output shafts 20, driven pulleys 39 fixed to driving wheels 4 and belts 40 stretching between pulleys 38 and 39. Each belt transmission mechanism 37 includes a steering clutch 41 conceived as a tension clutch. Steering clutch 41 comprises: a pair of arms 43 and 44 pivotally fitted to transmission case 36 above output shaft 20 so as to be swayable about a fulcrum shaft 42, these arms intersecting each other in an X-like configuration at fulcrum shaft 42; tension pulleys 45 and 46 provided at lower ends of arms 43 and 44 so as to contact belt 40 from back-and-forth directions; a tension spring 47, interposed between arms 43 and 44, for bringing pulleys 45 and 46 into close-contact with belt 40; cam rollers 48 and 49 fitted to the upper ends of arms 43 and 44; and a cam 50 movable up and down between rollers 48 and 49. When cam 50 is moved up by operating steering clutch levers 51 mounted on right and left handles 5, the pair of arms 43 and 44 oscillate, resisting spring 47. At this time, steering clutch 41 blocks the transmission of power through belt 40. The numeral 52 denotes a fuel tank provided upwardly of variable speed gear 18. Note that a gravity center G of the entire mower is in the vicinity of the front portion of axle 13.

Based on the above-described constitution, during travelling of the vehicle, the power is imparted from engine 16 via infinite variable-speed drive 24, main clutch 26, variable speed gear 18, output shafts 20 and belt transmission mechanisms 37 to the pair of right and left driving wheels 4, whereby these wheels are rotated forwards or backwards. In this case, crank shaft 17 of engine 16 is arranged to interlock with input shaft 19 of variable speed gear 18 through belt type infinite variable-speed drive 24, thereby obtaining a large reduction gear ratio.

When effecting the gyration, steering clutch lever 51 associated with the gyrating direction is operated, and the transmission of power to driving wheel 4 provided in the gyrating direction is blocked by steering clutch 41. At the same time, the front part of vehicle 1 is lifted by depressing handles 5, thus effecting the gyration. At this time, engine 16 and variable speed gear 18 are disposed in front and in rear of axle 13, and the gravity center G of the entire mower is in the vicinity of the front portion of axle 13. It is therefore feasible to easily raise the front part of vehicle 1 simply by slightly depressing handles 5. Besides, there is developed a well-balanced weight condition in front and in rear of driving wheels 4 in a state where vehicle 1 remains raised. The gyration can thus be effected with stability in posture. Steering clutch 41 includes the pair of tension pulleys 45 and 46, and hence the power can be switched on or off for either the forward movement or the backward movement.

Output shafts 20 of variable speed gear 18 are placed substantially above axle 13 which interlock and link together via belt transmission mechanisms 37 disposed in the up-and-down directions. With this arrangement, there is no necessity for restraining the vehicle 1 rear part height above the ground level. The height above the ground level can therefore be secured corresponding to a diameter of each driving wheel 4, thereby preventing impingement upon the obstacles on the ground when lifting the front part of vehicle 1. Output shafts 20 are provided at the front part of variable speed gear 18, so that the length in the to-and-fro directions can be reduced on the whole, as compared with an arrangement where the output shafts are disposed to protrude rearwardly of variable speed gear 18.

Infinite variable-speed drive 24 classified as a belt type drive is placed in close proximity to the lower part of vehicle 1 above axle 13. By virtue of this placement, the vehicle 1 height above the ground level is not decreased, and there is no possibility in which the grasses are rolled in belts 29 and 53. In addition, infinite variable-speed drive 24 is covered with brackets 12 from both sides. Therefore, drive 24 can be well protected by brackets 12 without employing a cover member.

The front part of vehicle 1 is equipped with caster wheels 2. This arrangement facilitates the gyration simply by disconnection of steering clutch 41 without lifting the front part of vehicle 1.

Although the illustrative embodiment has been described in detail with reference to the accompanying drawings, it is to be understood that the invention is not limited to this precise embodiment. Various changes or modifications may be effected therein by one skilled in the art without departing from the scope or spirit of the invention.

What is claimed is:

1. A gait type mower comprising:
   a vehicle;
   a mowing unit mounted on a front part of said vehicle;

a pair of right and left driving wheels provided at a rear part thereof;

handles positioned on the back side of said vehicle;

an engine loaded on said vehicle;

a variable speed gear interlocking with said engine and likewise loaded on said vehicle;

a pair of right and left output shafts fitted to said variable speed gear; and belt transmission mechanisms for imparting the power from said pair of right and left output shafts to said pair of right and left driving wheels, characterized in that: said engine is placed in front of an axle of said driving wheels, while said variable speed gear is placed in rear of said axle; said output shafts are positioned substantially upwardly of said axle in front of said variable speed gear; and said belt transmission mechanisms are disposed in the up-and-down directions.

2. The mower as set forth in claim 1, wherein said engine loaded on said vehicle in rear of said mowing unit, while said variable speed gear is disposed in the vicinity of a rear part of said engine.

3. The mower as set forth in claim 1 or 2, wherein a fuel tank is provided upwardly of said variable speed gear.

4. The mower as set forth in claim 1, wherein a crank shaft of said engine and an input shaft of said variable speed gear are protruded downwards, said crank shaft and said input shaft interlocking and linking together through a belt type infinite variable-speed drive.

5. The mower as set forth in claim 4, wherein said infinite variable-speed drive is placed in close proximity to a lower portion of said vehicle above said axle.

6. The mower as set forth in claim 4 or 5, wherein said infinite variable-speed drive includes a rotary shaft interposed between said crank shaft and said input shaft, and a variable speed pulley of said rotary shaft is interlocked with and linked to an input pulley of said input shaft as well as to a driving pulley of said crank shaft via belts.

7. The mower as set forth in claim 4 or 5, wherein variable speed gear and said rotary shaft are bilaterally spaced away from each other with respect to the center of said vehicle.

8. The mower as set forth in claim 4 or 5, wherein said infinite variable-speed drive is covered with brackets from both sides which are disposed on both sides of said vehicle, and said axle is supported on said brackets.

9. The mower as set forth in claim 1, wherein each of said pair of right and left belt transmission mechanisms is equipped with a tension type steering clutch.

10. The mower as set forth in claim 9, wherein said steering clutch is composed of: a pair of arms and pivotally so fitted to a fulcrum shaft as to intersect thereat; a pair of tension pulleys and so provided at the lower ends of said arms and as to contact a belt of said belt transmission mechanism from the to-and-fro directions; a tension spring, interposed between said arms, for bringing said tension pulleys and into close-contact with said belt; a pair of cam rollers attached to the upper ends of said arms; and a cam movable up and down between said cam rollers.

11. The mower as set forth in claim 1, wherein caster wheels are installed at the front end of said vehicle.

12. The mower as set forth in claim 1, wherein a gravity center of said entire mower is in the vicinity of the front portion of said axle.

* * * * *